J. W. KNOX.
Improvement in Horse Power.
No. 119,774.
Patented Oct. 10, 1871.

Witnesses:
John Becker.
Francis McArdle.

Inventor:
J. W. Knox.
Per Munn & Co.
Attorneys.

UNITED STATES PATENT OFFICE.

JAMES W. KNOX, OF WINONA, MISSISSIPPI.

IMPROVEMENT IN HORSE-POWERS.

Specification forming part of Letters Patent No. 119,774, dated October 10, 1871.

*To all whom it may concern:*

Be it known that I, JAMES W. KNOX, of Winona, in the county of Montgomery and State of Mississippi, have invented a new and Improved Horse-Power; and I do hereby declare that the following is a full, clear, and exact description thereof, which will enable others skilled in the art to make and use the same, reference being had to the accompanying drawing forming a part of this specification.

My invention relates to improvements in horse-powers; and it consists in a simple and economical arrangement of the sweep or hitching-bars for connecting, so as to apply the power directly to the rim of an overhead power-wheel, as hereinafter described.

Figure 1:
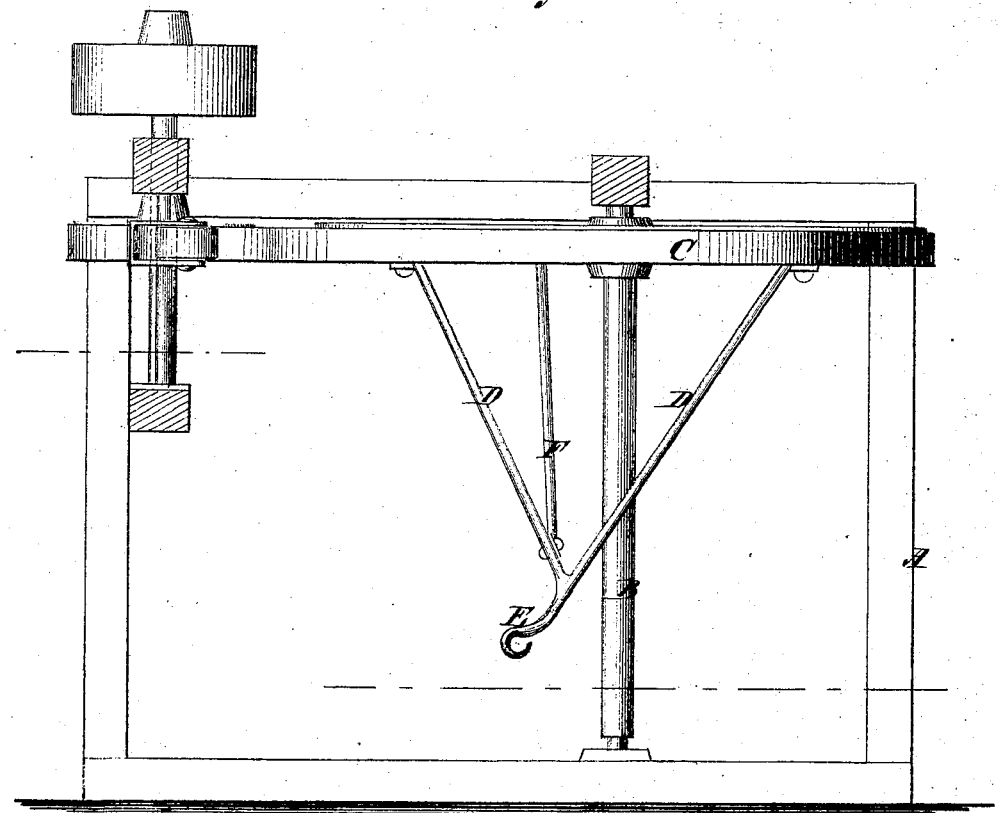
Figure 2:
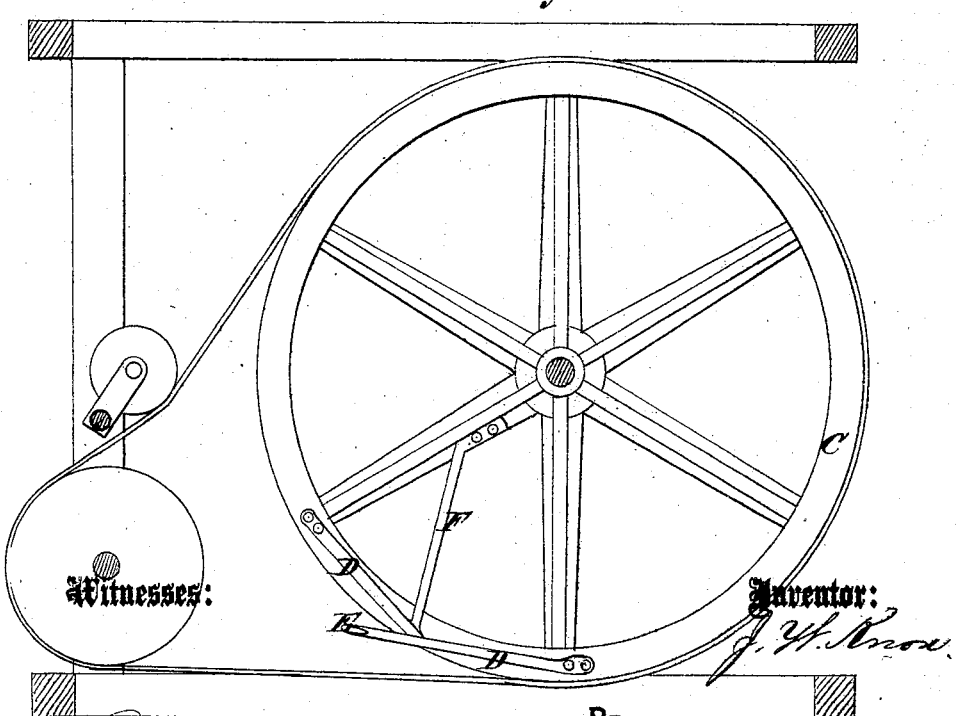

Figure 1 is a sectional elevation of my improved horse-power, and Fig. 2 is a sectional elevation.

Similar letters of reference indicate corresponding parts.

A is the frame, B the main vertical shaft, and C the main power-wheel. It is well known that something is gained in power, and that the shaft and arms of the wheel are relieved of considerable strain, by attaching the sweep or draw-bar directly to the rim of the wheel, which has been heretofore done; but, as a better, more simple, and economical means of so connecting to the rim than any heretofore employed, I propose to form the sweep of the branching metallic arms D and the hooked end E with a brace, F, connected to one of the arms near the crotch and extending upward and toward the center of the wheel to one of the arms, while the branches are connected to the rim, one in advance and the other behind the vertical plane of the hook. Each branch of the sweep thus composed of these arms is bolted to the wheel by a single bolt tapped into it, as clearly shown.

Thus, I provide a much stronger and more durable sweep for this kind of connection than any now in use, while the arrangement is such that it can be very economically constructed.

Having thus described my invention, what I claim as new, and desire to secure by Letters Patent, is—

The sweep-attachment to the overhead power-wheel, comprising the two branches D D, brace F, and the hooked part E, the branches D being bolted to the under side of the rim of the wheel and the brace bolted to one of the arms, all substantially as specified.

JAMES W. KNOX.

Witnesses:
  G. T. FERGUSON,
  THOS. I. BLACKMER.         (159)